(No Model.) 2 Sheets—Sheet 1.

S. W. HURLBURT.
STEAMER AND COOKER.

No. 553,309. Patented Jan. 21, 1896.

Witnesses
E. H. Monroe
V. B. Hillyard.

Inventor
Samuel W. Hurlburt.

By his Attorneys,
C. A. Snow & Co.

(No Model.) 2 Sheets—Sheet 2.

S. W. HURLBURT.
STEAMER AND COOKER.

No. 553,309. Patented Jan. 21, 1896.

Witnesses
E. H. Monroe
V. B. Hillyard

Inventor
Samuel W. Hurlburt

By his Attorneys,
C. A. Snow & Co.

UNITED STATES PATENT OFFICE.

SAMUEL WESLY HURLBURT, OF CRESTON, IOWA.

STEAMER AND COOKER.

SPECIFICATION forming part of Letters Patent No. 553,309, dated January 21, 1896.

Application filed July 11, 1895. Serial No. 555,661. (No model.)

*To all whom it may concern:*

Be it known that I, SAMUEL WESLY HURLBURT, a citizen of the United States, residing at Creston, in the county of Union and State of Iowa, have invented a new and useful Steamer and Cooker, of which the following is a specification.

This invention relates to that class of steamers designed for the preparation of food and for laundry use, and which is especially constructed with a view to preparing and cooking food by steam, and which will embody in its organization a tray for receiving jars of fruit, so as to prevent the latter from becoming broken or cracked during the steaming process, and which will provide separate and independent utensils for containing various articles of food—such as meats, vegetables, and pastries of all kinds.

For a full understanding of the nature of the invention reference is to be had to the following description and the accompanying drawings, in which—

Figure 1:
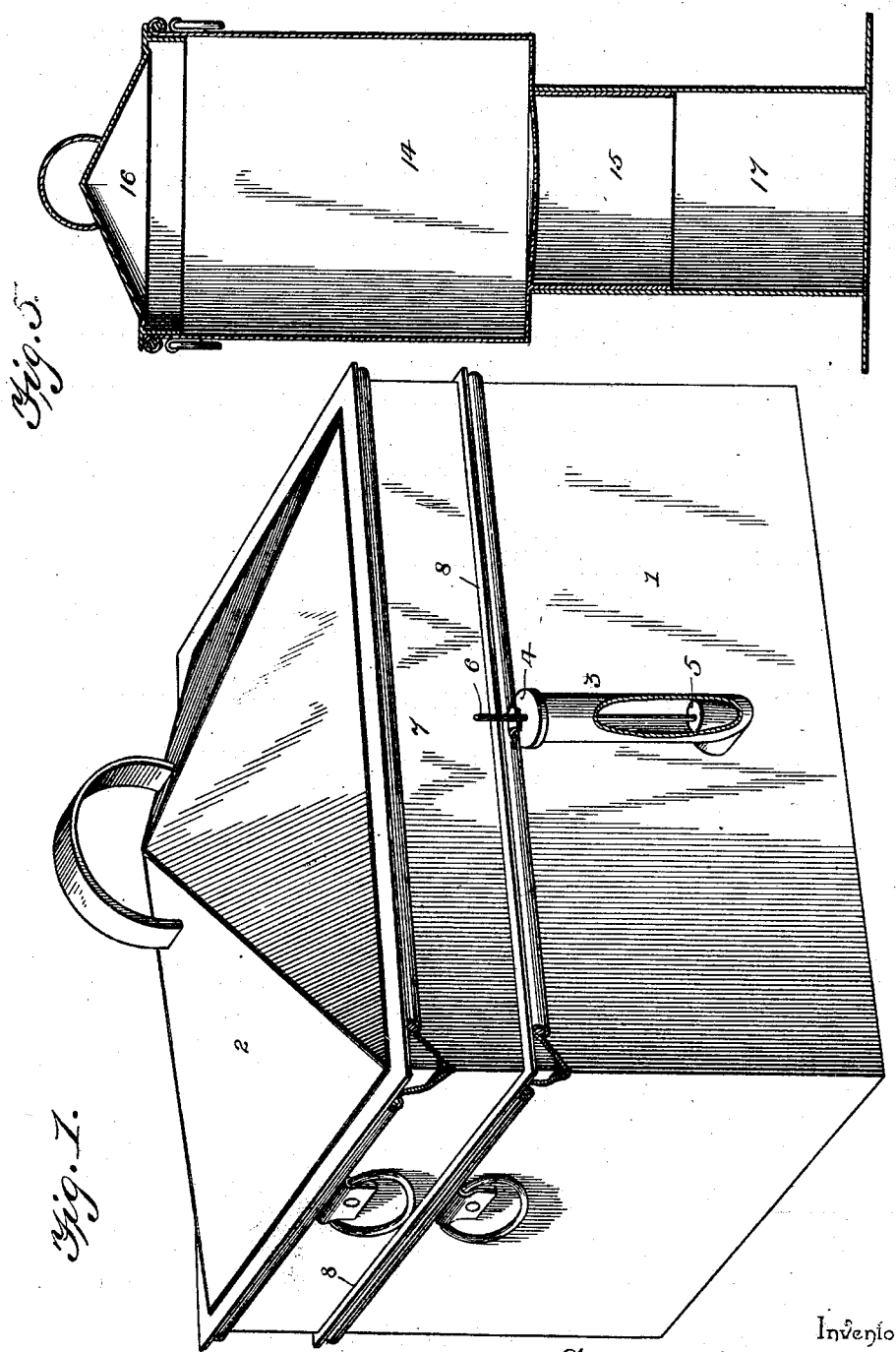
Figure 2:
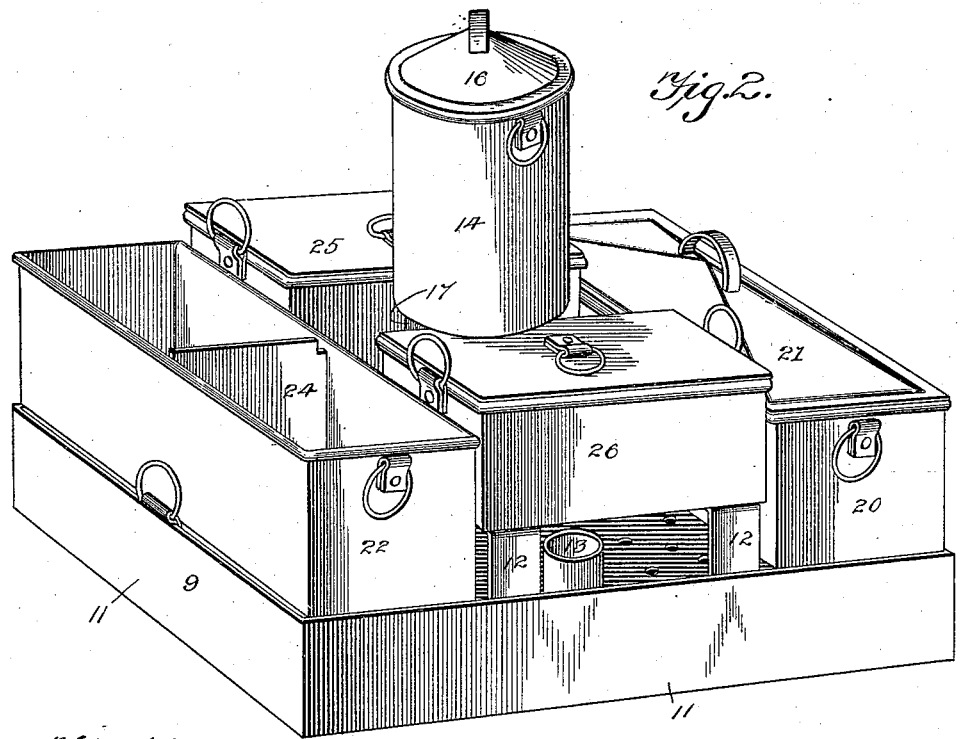
Figures 3, 4:
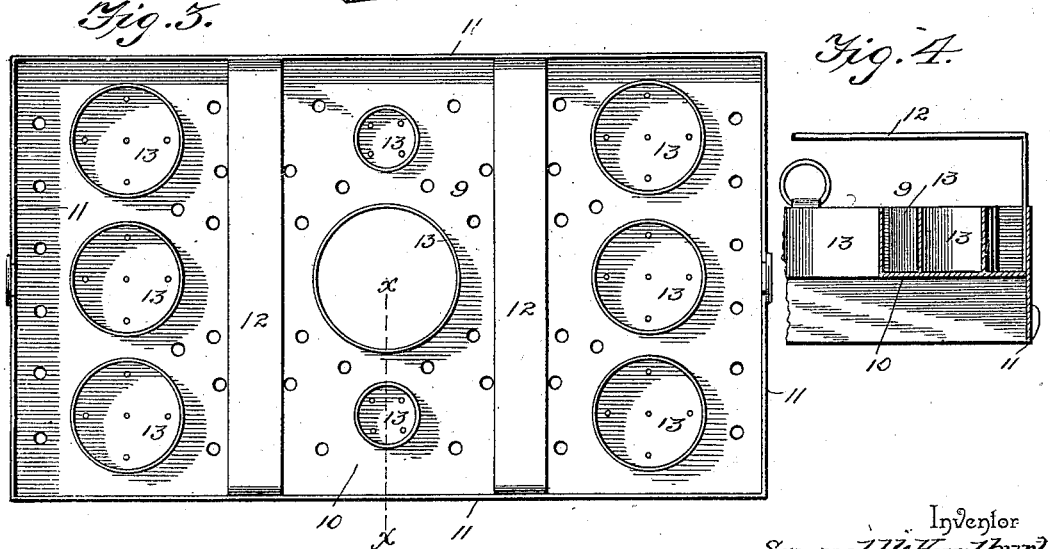

Figure 1 is a perspective view of a combined steamer and cooker constructed in accordance with this invention, parts being broken away. Fig. 2 is a detail perspective view of the tray, showing some of the various utensils grouped thereon. Fig. 3 is a top plan view of the tray. Fig. 4 is a detail section of the tray about on the line X X of Fig. 3. Fig. 5 is a vertical section of the steamer and the egg-basket.

The boiler 1 may be of any desired shape and size, and as illustrated is of rectangular form, and is adapted to be closed by means of a cover 2. A pipe 3 extends vertically along one side of the boiler and communicates with the bottom portion thereof, and its upper end, which terminates about in the plane of the top edge of the boiler, is open and is adapted to be closed by a hinged cover 4. A float 5 is placed in the pipe 3, and its stem 6 operates through an opening in the cover 4, and the purpose of this float and stem is to indicate the height of the water in the boiler, so that it may be known when the water is low and the boiler requires replenishing. The pan 7 has an outer flange 8 near its bottom and which is intended to extend over the top edge of the boiler and support the said pan therein, and this pan is shallow and may be used for mixing pastry, for washing dishes, or for warming cold food, or for any required purpose for which shallow pans are required in the kitchen. The cover 2 may be used interchangeably for closing the pan 7 or the boiler 1, as desired.

The tray 9 comprises a perforated bottom 10 and vertical sides 11, which extend above and below the bottom, as shown. That portion of the sides located below the bottom forms a support to hold the bottom 10 above the bottom of the boiler, and that portion of the sides projecting above the bottom 10 forms an inclosure, so as to retain utensils and articles in proper position and from slipping off the tray.

Bars or strips 12 have their end portions bent vertically and secured to the sides of the tray 9 and form handles to facilitate the carrying of the tray and supports for receiving any required utensil which it may be desired to support at a distance above the tray. A series of rings or bands 13 are arranged in rows and are secured to the bottom 10 and form cups for the reception of fruit-jars when it is required to steam the latter prior to sealing. These cups will be provided in various sizes to accommodate the different sizes of fruit-jars, and their bottoms will be perforated for the admission of steam and the escape of the water of condensation. The centrally-disposed band or ring is considerably larger than the rest, and its bottom is removed, thereby admitting of the largest-size fruit-jar or other utensil extending through the tray and resting upon the bottom of the boiler. The steamer 14 has a neck 15 which is adapted to be fitted to this central ring or band, and by means of which the steamer is held in proper position. This steamer may have any required form and may be employed for steaming food or any other article which it may be desired to subject to a steam-bath, and its open end will be closed by a cover 16 of any approved pattern.

The foot or stand 17 comprises a base portion, which is sufficiently broad to provide an extended area for the support of the utensil placed thereon, and a tubular portion which is of such relative size as to receive the neck 15 of the steamer. This foot or stand is especially designed for supporting the steamer at a distance above the tray greater than would be had by fitting the steamer to the central band or ring 13, and it may be used in connection with or without the tray as desired. When used with the tray the upper portion will be fitted in the central band or ring with the base portion resting upon the bottom of the boiler, and when the tray is not in position the steamer can be supported upon the foot or placed directly upon the bottom of the boiler. This steamer can also be used as an egg-basket, or a duplicate utensil may be provided for this purpose and used in the manner just described.

The box 20, which, as shown, is of rectangular shape, is closed by a cover 21 and is adapted to receive meats and vegetables when preparing the latter for the table. A similar box 22, closed by a cover similar to the box 20, is subdivided into compartments by means of a partition 24, and is used when it is required to cook the vegetables and the meat separately. There may be as many of these compartments as desired, although only two are shown. A box 25, constructed substantially as the box 20, but of smaller dimensions, is provided for preparing such farinaceous foods as rice without crushing the grain. A box 26, of duplicate construction to the box 25, is designed to facilitate the cooking and preparation of jellies, puddings, and other sweetmeats.

The several boxes may be used in connection with the tray or may be placed in the boiler independently thereof, and when all are in use they may be grouped and arranged on the tray substantially as shown in the drawings or in any other convenient and desired position.

The device, as intimated, is susceptible of general application for purposes of steaming, and it is contemplated to provide the same in various sizes. Therefore it is to be understood that in adapting the invention for a particular requirement changes in the form, proportion, and the minor details of construction may be resorted to without departing from the principle or sacrificing any of the advantages of this invention.

Having thus described the invention, what is claimed as new is—

1. In a steamer, a tray comprising a perforate bottom having vertically-extending sides which project above and below the plane of the bottom and provided with rows of rings forming cups to receive fruit jars or similar vessels and to form supports for cooking utensils, and bars coming opposite the spaces between the rows of cups and occurring in a higher plane than the latter, and having their ends bent and secured to the sides of the tray and forming handles and supports, substantially in the manner set forth.

2. In a steamer, the combination with the boiler, and a tray having a ring or band, of a foot piece resting upon the bottom of the boiler and adapted to extend through the ring or band of the tray, and a steamer to be fitted to the upper end of the foot piece, substantially as described.

3. In a steamer, a tray constructed substantially as herein set forth, the same comprising a perforate bottom having vertically-extending sides which project above and below the plane of the bottom and provided with rows of rings or bands forming cups of varying size, the middle cup being the largest and having its bottom removed, and bars arranged opposite the spaces between the rows of cups and having their end portions bent at substantially right angles and secured to the sides of the tray, the middle portion of the bars being straight and disposed in a higher plane than the tops of the said cups, substantially as set forth for the purpose described.

4. The herein-specified steamer, comprising a boiler, a pan having an outer flange and supported within the boiler by means of the said flange, a cover adapted to be interchangeably fitted to the pan or the boiler for closing either, a perforate-bottom tray having rows of cups of varying size, the central cup being the largest and having its bottom removed, and having handle bars located opposite the spaces between and in a higher plane than the said cups, a steamer to be fitted to the said central cup, and a series of food-receiving boxes capable of being supported upon the cups and handle bars, substantially in the manner and for the purpose specified.

In testimony that I claim the foregoing as my own I have hereto affixed my signature in the presence of two witnesses.

SAMUEL WESLY HURLBURT.

Witnesses:
MARY E. CARTER,
MORETON STELLA DEAVOR BEARD.